United States Patent [19]

Hergenrother et al.

[11] Patent Number: 4,847,360

[45] Date of Patent: Jul. 11, 1989

[54] ADHESIVE ACTIVE FINISH FOR REINFORCING MEMBERS AND RELATED METHODS

[75] Inventors: William L. Hergenrother, Akron; Mario N. DeTrano, Massillon, both of Ohio

[73] Assignee: The Firestone Tire & Rubber Company, Akron, Ohio

[21] Appl. No.: 209,673

[22] Filed: Jun. 21, 1988

Related U.S. Application Data

[63] Continuation-in-part of Ser. No. 20,414, Mar. 2, 1987, abandoned.

[51] Int. Cl.$^4$ .................. C08G 59/22; C08G 59/64
[52] U.S. Cl. ................................ 528/407; 523/414; 528/111
[58] Field of Search ................ 528/407, 111; 523/414

[56] References Cited

U.S. PATENT DOCUMENTS

| | | | |
|---|---|---|---|
| 3,154,429 | 10/1964 | Albrecht et al. | 117/39.5 |
| 3,278,460 | 10/1966 | Auerbach et al. | 260/2 |
| 3,303,144 | 2/1967 | Strother, Jr. | 260/2 |
| 3,318,750 | 5/1967 | Aitken | 156/331 |
| 3,349,053 | 10/1967 | Ashby | 260/29.2 |
| 3,350,325 | 10/1967 | Ashby et al. | 260/2 |
| 3,408,249 | 10/1968 | Grown | 161/88 |
| 3,420,794 | 1/1969 | May et al. | 260/47 |
| 3,792,018 | 2/1974 | Logan | 260/47 EN |
| 3,878,132 | 4/1975 | Bertram et al. | 260/2 EP |
| 3,892,684 | 7/1975 | Logan | 260/2 N |
| 3,968,304 | 7/1976 | Wise | 428/272 |
| 4,255,311 | 3/1981 | Eldin et al. | 523/414 X |
| 4,292,111 | 9/1981 | Bezwada | 156/307.7 |
| 4,374,031 | 2/1983 | Kudo et al. | 252/8.8 |
| 4,399,242 | 8/1983 | Fowler et al. | 523/404 |
| 4,446,307 | 5/1984 | Shirk | 528/406 |
| 4,477,497 | 10/1984 | Kudo et al. | 427/386 |
| 4,500,604 | 2/1985 | Herold et al. | 428/414 |
| 4,536,526 | 8/1985 | Murase | 523/433 |
| 4,680,228 | 7/1987 | Sharma | 428/378 |

FOREIGN PATENT DOCUMENTS 2257926 11/1972 Fed. Rep. of Germany.
2115424 2/1982 United Kingdom.

OTHER PUBLICATIONS

L. B. Ingram, "New Polyester Dip System Results in Improved Adhesion and Processing Cost Reductions" presented to the Rubber Division of the American Chemical Society, Spring 1981, Minneapolis, Minn.
Alfred Renner and Klaus Peter Michaelis, "Thermoplastic Resins, Polyquats, and Membranes based on Epoxies" Journal of Polymer Science: Polymer Chemistry Edition, vol. 22, 249–262, (1984).

Primary Examiner—Earl Nielsen
Attorney, Agent, or Firm—Daniel N. Hall

[57] ABSTRACT

Adhesive active finish compositions for synthetic reinforcing members to bond the latter to vulcanizable rubber and reinforcing members for vulcanizable rubber. The adhesive composition comprises a water soluble epoxy compound, from about 20 to 100 parts by weight of a trialkanolamine having from 3 to about 15 carbon atoms and from about 0 to 80 parts by weight of a polyol co-curative having from 2 to about 15 carbon atoms and having at least 2 primary hydroxyls per molecule, wherein the stoichiometric ratio of hydroxyl groups to epoxy groups from the water soluble epoxy compound ranges from about 1:0.7 to 1:0.0003. A method of reinforcing articles of vulcanizable rubber with fibrous members includes the steps of applying to the fibrous member a first coating of the adhesive active finish; applying a second coating comprising resorcinol, formaldehyde and a rubber latex over the first coating; embedding the coated fibrous member in the vulcanizable rubber and, vulcanizing the rubber. Synthetic reinforcing yarns containing the adhesive active finish and a method for their production are also disclosed.

7 Claims, No Drawings

ADHESIVE ACTIVE FINISH FOR REINFORCING MEMBERS AND RELATED METHODS

CROSS-REFERENCE TO RELATED APPLICATION

This application is a continuation-in-part of U.S. Ser. No. 020,414 filed Mar. 2, 1987 now aband.

TECHNICAL FIELD

The present invention is directed toward improving the adhesion and adhesion retention between a rubber composition, used in the manufacture of tires, conveyor belts, hoses and the like, and synthetic fiber reinforcement cord, such as polyester, which is embedded in the rubber stock. Flat sheets of such stocks, reinforced with fibers, are utilized as plies or other components of the article and are referred to in the art as rubber skim stocks. Skim refers to a relatively thin layer or coating of the rubber over the reinforcement filaments or cords.

In order to obtain the improved adhesion, a novel adhesive active finish has been developed which is applied to the fiber cord reinforcement as a coating prior to its incorporation into the rubber stock. The coated fiber cord adheres better to the rubber. A method for treating a fiber cord reinforcement is also set forth.

BACKGROUND ART

In order to promote adhesion between rubber compositions and synthetic fiber reinforcement, it is known to add various compounds to the rubber and to employ one or more coatings of materials to the fiber which will allow the fiber to become more firmly bonded to the rubber. Present technology has provided various combinations of coatings and additives which may be utilized together to form the article. In such instances, the fiber coating should be capable of bonding to one or more components or active groups present in the rubber stock, particularly the adhesion promoting additives. As noted hereinabove, the present invention is directed toward adhesive active coatings and thus, additives to the rubber stock do not constitute an element of the invention.

Adhesives that are employed in the tire and rubber industries are crosslinked polymeric three dimensional networks. They are used to join two other polymers, i.e., a reinforcing fabric such as cotton, rayon, nylon, polyester or aramid and an elastomer or blend of elastomers. The elastomers are suitably compounded such that the final cured reinforced rubber product will provide an acceptable level of performance.

The principal reinforcements used in rubber products are rayon, nylon, or polyester, alone or in combination with fiberglass, steelcord or aramid. Polyester is presently displaced nylon, cotton and rayon in belt and hose products and is therefore a good candidate for adhesive active coatings. Since 1935, dip systems comprising resorcinol-formaldehyde and rubber latex, or RFL, have been the systems of choice for many reinforced rubber products, with the first commercial application being used in combination with rayon tirecord.

RFL dip systems can be used on polyester but in order to achieve acceptable total performance, modifications are necessary. One such modification is taught by U.S. Pat. No. 3,318,750, which provides an adhesive composition to dip coating fibrous materials for reinforcing vulcanizable rubber. The composition comprises 5 to 50 parts by weight of an aqueous solution and 50 to 95 parts by weight of a rubber latex. The aqueous solution contains 5 to 60 percent by weight of a reaction product of formaldehyde and acetaldehyde with a composition derived from the reaction of triallyl cyanurate and a polyhydric alcohol. The method taught is practiced by applying a finish of aldehyde, unsaturated aliphatic ester of cyanuric acid and a polyhydric alcohol and then a finish of a rubbery latex-resorcinol-formaldehyde dispersion.

This technology was also published in a paper entitled "New Polyester Dip System Results in Improved Adhesion and Processing Costs Reduction" presented to the Division of Rubber Chemistry, ACS, 119th Meeting, Paper No. 23 (1981). It describes a water soluble complex reaction product, called N-3, which contains the cyanurate component set forth in U.S. Pat. No. 3,318,750. Usefulness of the product is attributable to the fact that it provides better adhesion between polyester and rubber than an RFL coating alone. Also it can be used directly with the RFL composition, for a one dip process or, the RFL can be applied thereover in a two dip process.

Another approach has been the coating of polyester fibers with epoxy compounds which may also receive an RFL dip. Adhesion between the cured rubber and the reinforcing cord is thereby improved.

U.S. Pat. No. 4,446,307 provides a stable adhesive composition based upon a polyfunctional epoxide and a catalyst selected from the group consisting of tertiary amines, quaternary ammonium salts, quaternary phosphonium salts and triphenylphosphine. An aqueous solution of the adhesive is applied to the reinforcing filament which is subsequently incorporated into a rubber compound.

U.S. Pat. No. 4,477,497 provides a method of manufacturing polyester fibers having good adhesion to rubber which involves applying an adhesive finish composition to the fiber and then heat treating. The finish comprises a lubricant, an epoxy compound and a novolak resin.

U.S. Pat. No. 4,536,526 also provides a method as well as a finish composition. The latter comprises a lubricant, at least 80 weight percent of which is an ester of triodicarboxylic acid; an epoxy resin and a surfactant. The method calls for the application of the finish to the polyester fiber followed by heat treatment.

Such systems may not have provided satisfactory hydrolytic stability. Also the use of a high heat treatment step to cure the epoxy coating can be deleterious to the heat stabilized reinforcing cord.

DISCLOSURE OF THE INVENTION

The present invention provides an adhesive active finish composition solution for synthetic reinforcing members to bond the latter to vulcanizable rubber which comprises a water soluble epoxy compound, from about 20 to 100 parts by weight of a trialkanolamine having from 3 to about 15 carbon atoms, and from about 0 to 80 parts by weight of a polyol co-curative having from 2 to about 15 carbon atoms and having at least 2 primary hydroxyls per molecule, wherein the stoichiometric ratio of hydroxyl groups to epoxy groups from the water soluble epoxy compound ranges from about 1;0.7 to 1:0.0003.

A reinforcing member for vulcanizable rubber is also provided which includes a plurality of strands of synthetic fiber and a coating comprising a water soluble epoxy compound, from about 20 to 100 parts by weight of a trialkanolamine having from 3 to about 15 carbon atoms, and from about 0 to 80 parts by weight of a polyol co-curative having from 2 to about 15 carbon atoms and having at least 2 primary hydroxyls per molecule, wherein the stoichiometric ratio of hydroxyl groups to epoxy groups from the water soluble epoxy compound ranges from about 1:0.7 to 1:0.0003.

A method of producing fibrous members having improved adhesion to vulcanizable rubber is also provided which comprises the step of applying to the fibrous member a coating comprising a water soluble epoxy compound, from about 20 to 100 parts by weight of a trialkanolamine having from 3 to about 15 carbon atoms, and from about 0 to 80 parts by weight of a polyol co-curative having from 2 to about 15 carbon atoms and having at least 2 primary hydroxyls per molecule, wherein the stoichiometric ratio of hydroxyl groups to epoxy groups from the water soluble epoxy compound ranges from about 1:0.7 to 1:0.0003.

A method of reinforcing articles of vulcanizable rubber with fibrous yarn is also provided which includes the steps of applying the adhesive active finish of the present invention to the fibrous yarn, applying a second coating comprising resorcinol, formaldehyde and a rubber latex over the first coating, embedding the coated fibrous member in the vulcanizable rubber and vulcanizing the rubber.

Unlike coating technology employed heretofore, the epoxy employed does not require heat for cure and therefor properties imparted to the synthetic reinforcing member by heat are not affected. Also, by use of the adhesive active finish of the present invention, the second, RFL coating can be applied at much lower temperatures and still develop adhesion to the previously coated reinforcing member. Again, the lower temperature avoids damage to the heat stabilized member and also reflects an energy savings.

PREFERRED MODE FOR CARRYING OUT THE INVENTION

Synthetic reinforcing filaments or yarn utilized in rubber articles include such polymers as rayon, the nylons, the aramids, polyester and the like. The adhesive active finish composition of the present invention has been found to be highly suitable with polyester yarn with which the invention has been exemplified herein. Nevertheless, it may also have utility with other reinforcing yarn such as the aramids and therefore, its use as a finish coating should not be limited to polyesters, per se.

The adhesive composition comprises a mixture of a water soluble epoxy compound and a curative having at least three active hydrogens. Typical of such curatives are amines, carboxylates, mercaptans, trialkanolamines and related compounds which can release hydrogen atoms to cure the epoxy. Trialkanolamines having from 3 to about 15 carbon atoms are preferred, particularly triethanolamine, exemplified hereinbelow. Trialkanolamines provide three primary hydroxyl groups for the release of three active hydrogens.

The trialkanolamines can optionally be employed with a co-curative to form a curative mixture comprising from about 20 to 100 parts by weight of trialkanolamine and from about 0 to 80 parts by weight of the co-curative. The polyols having from 2 to about 15 carbon atoms can be employed as co-curatives. They are preferably primary hydroxy polyols or they contain at least 2 primary hydroxyls per molecule. Typical polyols are the aliphatic and cyloaliphatic diols, triols, tetraols and the like. Cycloaliphatic species include cyclic compounds having alkyl side chains which contain primary hydroxyls. A suitable aliphatic polyol is trimethylol propane.

The water soluble epoxy compounds can be exemplified by glycerol polyglycidyl ether (GPGE). Analysis of the compound reveals the following supposed chemical structures:

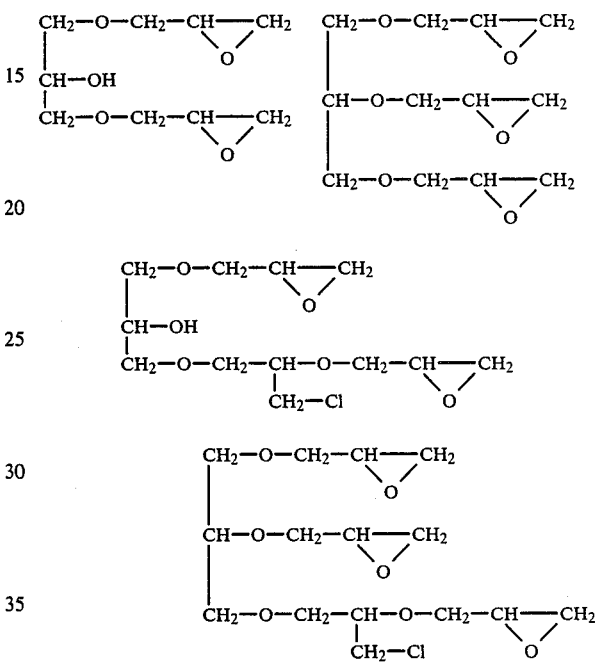

The epoxy is a mixture of these structures and the gram equivalent weight can range from about 87 to over 145 such as up to about 150 depending upon the manufacturing process and chlorine content. Generally, a suitable weight is 141.

Based upon the gram equivalent weight of the epoxy compound, the stoichiometric amount of curative necessary can be calculated according to the following equation:

$$\text{Grams of curative} = \frac{M.W.(\text{curative}) \times 100}{g\text{-}eq(\text{epoxy}) \times \text{functionality of curative}}$$

For triethanolamine as the curative, the stoichiometric amount according to the equation is about 35.2 grams per hundred grams of epoxy having an equivalent weight of 141. Actually the epoxy can be cured satisfactorily with considerably less than the stoichiometric amount, as well as an amount greater. For the present invention, the stoichiometric ratio of hydroxyl groups to epoxy groups ranges between from about 1:0.7 to 1:0.0003. Thus, if any other water soluble epoxy compound is selected, knowledge of its equivalent weight will enable one to calculate the stoichiometric amount of curative which, in turn, can also be varied by substituting the molecular weight and functionality thereof into the previous equation. In any instance, the gram amount calculated can be varied within the foregoing stoichiometric range.

For glycerol polyglycidyl ether and triethanolamine the amounts can also be expressed as 100 grams of epoxy to 35.2 grams of curative or 35.2 parts curative per 100 parts of epoxy (phe) stoichiometric. More broadly the range is from about 0.1 parts to 42 parts by weight of the curative per hundred parts of epoxy.

The epoxy and curative and optional co-curative can be combined and applied neat to the yarn to provide a surface coating of from about 0.05 to 3 weight percent and preferably from about 0.1 to 1 weight percent. The mixtures of the two components can also be prepared in aqueous media or organic media using ketones, chlorinated solvents and the like in order to reduce the viscosity of the mixtures. The resulting solution contains from about 0.5 to 95 percent solids by weight.

In the manufacture of synthetic reinforcing materials, the individual fiber is first formed. A large number of fibers are gathered together to form the yarn which is untwisted. Subsequently, a desired number of yarn plies, e.g., 3 are twisted together to form the cord. The adhesive active finish composition can be applied by any suitable apparatus that essentially coats the yarn with the finish. If a solvent is present, the yarn must be allowed to dry. Drying can be conducted at elevated temperatures so long as these remain below the temperature at which heat stabilized properties would suffer. The yarn can also be subjected to an optional heating step before the finish is applied in order to remove any possible moisture. Heating should also not be high enough to cause any loss of properties of the yarn.

It is also possible to apply the adhesive active finish composition to the cord. However, for ease of discussion, reference shall continue to be made throughout the specification to yarn with the understanding that cord is also contemplated. Generally, the two can be identified as the synthetic reinforcing member.

The yard, treated with the adhesive finish composition, can be stored for long periods of time until it is ready to be incorporated or embedded into a rubber composition. Such incorporation is commonly facilitated with calendering apparatus which again, does not limit the present invention.

When the yarn is ready for incorporation, it is given a second coating this one being a known RFL dip material. Such materials, as previously noted are well known in the art and comprise basically resorcinol, formaldehyde and a rubber latex such as styrene-butadiene rubber, SBR. Inasmuch as these dip coating compounds are common, the particular components and amounts thereof are not necessarily critical to the practice of the method of the present invention which generally provides that a second coating of this generally composition be applied before the yarn becomes embedded in the vulcanizable rubber.

As to the vulcanizable rubber that can be reinforced with the yarn product of the present invention, natural rubber may be employed in either a pure or blended state with synthetic rubbers such as styrene-butadiene, butyl, ethylene-propylene-diene, halobutyls, synthetic isoprene or other synthetic rubbers. Further, pure forms of synthetic rubbers such as those disclosed may be used either alone or blended with other synthetic rubbers.

To demonstrate practice of the present invention, several adhesive active finishes were prepared, as described hereinbelow, to coat strands of polyester fiber cord.

Preparation of Adhesive Active Finish

A 2% by weight solution of glycerol polyglycidyl ether in methyl ethyl ketone was prepared at room temperature. Next, triethanolamine was added at a level corresponding to 11.8% of the weight of the glycerol polyglycidyl ether. The resulting solution, herein identified as solution A, was found to be clear and stable. A second solution comprising 2% glycerol polyglycidyl ether in toluene, but without the triethanolamine, was made up for use in preparing control cord and is herein identified as the Control.

The two solutions, A and the Control, were used to coat 300 foot (91 M) lengths of polyester cord (3 ply, 1000 denier per ply, 10.4 x. 10.4 twist), Examples 1 and 2, respectively. To coat the cord with the finish, a bench-top apparatus was set up providing a feed roller, take-up roller, oven, an immersion bath containing the appropriate solution. The oven is used optionally to pre-dry the cord surface of possible moisture prior to immersion and optionally to postheat the coated cord following immersion to evaporate the solvent and initiate cure in Example No. 1. Of course, where the coated yarn is not to be used immediately, the post-heat step would not be necessary. Operating speed was approximately 20 feet/min (6.1 M/min) with a total tension on the cord of about 1000 g. Conditions are presented in greater detail in Table I.

TABLE I

| Cord Coating Conditions | | |
|---|---|---|
| | Temp °C. | Dwell Time (sec) |
| Pre-dry oven | 120 | 3–4 |
| Immersion bath | 25 | 1 |
| Post-heat oven | 125, 175, 225 | 6–8 |

The cord samples containing Solution A and the Control were both subsequently coated with resorcinol-formaldehyde-latex (RFL) dip containing a dispersion of carbon black. A three zone Litzler treating unit was employed and treating conditions are present in Table II.

TABLE II

| RFL Coating Conditions | | | |
|---|---|---|---|
| | Temperature Profile A °C. | Time (sec) | Stretch (%) |
| Zone 1 | 25–40 | 90 | 1 |
| Zone 2 | 149 | 90 | 1 |
| Zone 3 | 204 | 90 | 1 |

The dip treated cord samples were then embedded in a vulcanizable rubber compound, Stock R, in a configuration for evaluation by standard U-adhesion testing, which measured the force required to pull the sample from a section of the vulcanized rubber. Composition of Stock R is presented hereinbelow with all parts given on the basis of parts per hundred parts of rubber (phr) by weight.

| Compounding Ingredients | Stock R |
|---|---|
| Natural Rubber | 50 |
| SBR | 50 |
| Carbon Black | 75 |
| Resin | 18.1 |
| Processing oil | 12 |
| Zinc oxide | 3 |
| Sulfur | 2.3 |
| Accelerator | 1.9 |

| Compounding Ingredients | Stock R |
|---|---|
| Stearic acid | 1 |

The U-adhesion test was conducted according to the procedures set forth in ASTM D2138, Vol. 09.01.

The results of adhesion testing have been presented in Table III. The force necessary to pull or remove the cord reinforcement from the vulcanized rubber skim stock is given first, in kg, followed by the percent of rubber skim stock remaining on the surface of the cord reinforcement. The amount of rubber skim stock remaining on the cord reinforcement was determined by visual examination and has been reported as % rubber coverage. The amount of adhesive active finish on the cord was determined by titration of unreacted epoxy and is reported under the column heading "Reactive Epoxy Measured on Cord". The effect of the optional post heat step was seen to be negligible in the case of the catalyzed composition. A second control, Example No. 3, was also subjected to testing which consisted of the same type of polyester cord carrying only the RFL dip coat.

TABLE III

U-Adhesion Results

| | Post-Heat °C. | Reactive Epoxy Measured on Cord Wt % | U-Adhesion Kg | Rubber Coverage % |
|---|---|---|---|---|
| Example No. 1 | 25 | .17 | 18.2 | 80-90 |
| | 125 | .13 | 19.2 | 80-90 |
| | 175 | .17 | 18.1 | 90-95 |
| | 225 | .16 | 18.6 | 90-95 |
| Example No. 2 (Epoxy alone) | 25 | .26 | 16.2 | 60-80 |
| | 175 | .32 | 16.7 | 60-80 |
| | 225 | .27 | 18.1 | 80-90 |
| Example No. 3 (RFL alone) | — | — | 14.3 | 10-30 |

From the results reported in Table III, it can be readily seen that the dip coated cord according to the present invention showed greater adhesion to the rubber as evidenced by the greater force necessary to pull the cord from the rubber and by the grater amount of rubber remaining on the cord.

The rubber coverage measurement is deemed to be significant in that it visually represents the increased adhesion of the rubber composition to the reinforcing cord. As is well known to those skilled in the art, the amount of rubber remaining on the cord after it has been pulled from a cured rubber pad represents the relationship of the adhesive force attaching the rubber composition to the surface of the cord and the tensile strength of the rubber composition itself. Large percentages of rubber coverage indicate that the adhesion to the cord exceeds the cohesive strength of the rubber composition itself. Therefore, when the rubber coverage is very high it can be concluded that the cord to rubber adhesion is greater than the force measured to pull the cord out of the rubber pad since the force measured was a result of the rubber composition rupturing and not the breakage of chemical bonds formed at the cord rubber interface.

A second series of cord samples was prepared using the same three ply polyester cord described hereinabove. For Example No. 4, glycerol polyglycidyl ether and approximately 10% triethanolamine was applied neat. The finish on the cord provided 0.94% of the epoxy and 0.09% of triethanolamine. Example No. 5 consisted of the epoxy alone and provided a finish of 0.86% on the cord. Both cords received a subsequent RFL dip prior to being embedded in rubber. Example No. 6 consisted of the RFL dip alone as a Control. For the U-adhesion testing, each cord was then embedded in Stock R and cured as described hereinabove. Heat treatment for the RFL application was varied and has been provided in Table IV. The cords were also subjected to Peel adhesion testing according to ASTM D2360 Vol. 09.01 on one inch (2.5 cm) wide samples employing a rubber composition similar to Stock R. U-adhesion testing was also employed and the results from both tests have been provided in Table V.

TABLE IV

| | RFL Coating Conditions | |
|---|---|---|
| | Temperature Profile B °C. | Temperature Profile C °C. |
| Zone 1 | 121 | 216 |
| Zone 2 | 135 | 238 |
| Zone 3 | 182 | 238 |

TABLE V

Peel Adhesion and U-Adhesion

| | Peel Adhesion Profile B Kg | U-Adhesion Profile B Kg | U-Adhesion Profile C Kg |
|---|---|---|---|
| Example No. 4 (Adhesive finish) | 27.5 | 15.0 | 14.2 |
| Example No. 5 (Epoxy alone) | 22.2 | 13.9 | 13.0 |
| Example No. 6 (RFL alone) | 12.3 | 9.0 | 12.1 |

In each instance the finish composition of the present invention, Example No. 4, provided the greatest adhesion. The effect of increasing temperature was not overly significant except to note that the RFL dip treatment (Example No. 6) benefitted.

A third series of cord samples was prepared, again using the same three ply polyester cord described hereinabove. In this series the amount of trialkanolamine as a curative for GPGE was varied. The relative amounts of GPGE, curative and solvent (MEK) are presented in Table VI which also provides the ratio of hydroxyls to epoxies; the percentages of epoxy initially, or in solution, and when dipped, i.e. epoxy on the cord; and, the U-adhesion test results. Examples No. 7-10 were coated with the different adhesive active finishes and then received a subsequent RFL dip prior to being embedded in rubber similar to Stock R. Example No. 11 served as a separate control and received only the RFL dip. Heat treatment for the RFL application was the same as described hereinabove. U-adhesion testing was conducted as discussed hereinabove.

TABLE VI

Variations in the Amount of Curative

| Example No. | 7 | 8 | 9 | 10 | 11 |
|---|---|---|---|---|---|
| GPGE (g) | 6.52 | 6.52 | 6.52 | 6.52 | — |
| MEK (g) | 319.5 | 319.5 | 319.5 | 319.5 | — |
| TEOA (g) | 1.30 | .65 | .33 | .065 | — |
| OH/epoxy | .566 | .283 | .144 | .028 | — |
| % epoxy, initial | .47 | .38 | .37 | .35 | — |
| % epoxy, when dipped | 0 | 0 | .15 | .23 | — |
| U-Adhesion Kg | 10.8 | 13.4 | 12.5 | 10.8 | 7.6 |

TABLE VI-continued

| | Variations in the Amount of Curative | | | | |
|---|---|---|---|---|---|
| Example No. | 7 | 8 | 9 | 10 | 11 |
| Rubber Coverage % | 10–40 | 70–90 | 10–50 | 40–70 | 10–20 |

A fourth series of cord samples was prepared also using the same three ply polyester cord described hereinabove. In this series, triethanolamine was employed as the curative and trimethylol propane (TMP) was added as a cocurative, in varying amounts. The relative amounts of GPGE, curative, cocurative and MEK solvent are presented in Table II which also provides the ratio of hydroxyls to epoxies; the percentages of epoxy in solution and on the cord; and, the U-adhesion test results. Examples No. 12–14 were coated with the different adhesive active finishes and then received a subsequent RFL dip prior to being embedded in rubber similar to Stock R. Example No. 15 served as another separate control and received only the RFL dip. Heat treatment for the RFL dip application was the same as described hereinabove. U-adhesion testing was conducted as described hereinabove.

TABLE VII

| Use of a Co-Curative in the Adhesive Active Finish With Added TMP | | | | |
|---|---|---|---|---|
| Example No. | 12 | 13 | 14 | 15 |
| GPGE (g) | 6.52 | 6.52 | 6.52 | — |
| MEK (g) | 319.5 | 319.5 | 319.5 | — |
| TEOA (g) | 0.85 | 0.85 | 0.85 | — |
| TMP (g) | — | 0.33 | 0.65 | — |
| OH/epoxy | .368 | .525 | .683 | — |
| % epoxy, initial | 0.40 | 0.34 | 0.34 | — |
| % epoxy, when dipped | 0 | 0 | 0 | — |
| U-Adhesion Kg | 18.1 | 19.1 | 18.4 | 13.4 |
| Rubber Coverage % | 90–95 | 90–95 | 90–95 | 20–30 |

In both Tables, the effect of the adhesive active finish over the controls is evident. Example No. 14 provides a ratio of hydroxyl to epoxy of 1:0.683 or about 1:0.7, the upper limit of the operable ratio of curative hydroxyls.

Based upon the foregoing results, it should be evident that the adhesive active finish of the present invention improves adhesion between vulcanizable rubber and polyester yarn. Moreover, the coated yarn has been demonstrated to have improved utility when used in the method of reinforcing rubber articles.

It is to be understood that the foregoing examples have been provided to enable those skilled in the art to have representative examples by which to evaluate the invention and that these examples should not be construed as any limitation on the scope of this invention. Inasmuch as the composition of the adhesive active finish employed in the present invention can be varied within the scope of the total specification, neither the particular components nor the relative amounts of the components exemplified herein shall be construed as limitations of the invention. Similarly, the present invention should not be limited to the treatment of polyester cord nor to any specific RFL coating layer in the method for reinforcing vulcanizable rubber articles.

In conclusion, it is to be understood that all methods compounds and synthetic fibers disclosed herein fall within the scope of the claimed invention. As will be apparent to those skilled in the art, the formulation of the adhesive active composition can be varied within the scope of the total specification disclosure by selection of various water soluble epoxies and trialkanolamine curvatives as well as the amounts thereof, and it is believed that practice of the present invention can be determined without departing from the spirit of the invention herein disclosed and described, the scope of the invention being limited solely by the scope of the attached claims.

We claim:

1. An adhesive active finish composition solution for synthetic reinforcing members to bond the latter to vulcanizable rubber consisting essentially of:
   a water soluble compound comprising a polyglycidyl ether;
   from about 20 to 100 parts by weight of a trialkanolamine having from 3 to about 15 carbon atoms; and
   from about 0 to 80 parts by weight of a polyol cocurative having from 2 to about 15 carbon atoms and having at least 2 primary hydroxyls per molecule, wherein the stoichiometric ratio of hydroxyl groups to epoxy groups from said water soluble epoxy compound ranges from about 1:0.7 to 1:0.0003.

2. An adhesive active finish composition, as set forth in claim 1, wherein said water soluble epoxy compound has an equivalent weight ranging from about 87 to about 150.

3. An adhesive active finish composition, as set forth in claim 2, wherein said water soluble compound is glycerol polyglycidyl ether.

4. An adhesive active finish composition, as set forth in claim 1, wherein said trialkanolamine is triethanolamine.

5. An adhesive active finish composition, as set forth in claim 4, wherein said polyols are selected from the group consisting of aliphatic and cycloaliphatic diols, triols and tetraols.

6. An adhesive active finish composition, as set forth in claim 5, wherein said triol is trimethylol propane.

7. An adhesive active finish composition, as set forth in claim 1, further comprising a solvent for said epoxy and said curative mixture.

* * * * *